July 27, 1948.  H. C. HEINSOHN, JR  2,445,828
VARIABLE ANGLE GEAR CASING
Filed Oct. 30, 1945  3 Sheets-Sheet 1
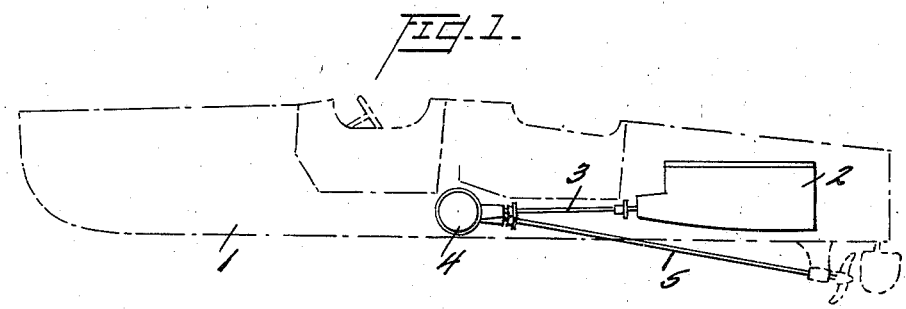
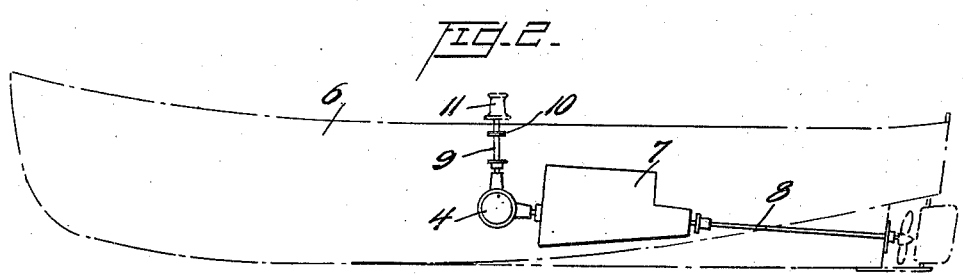
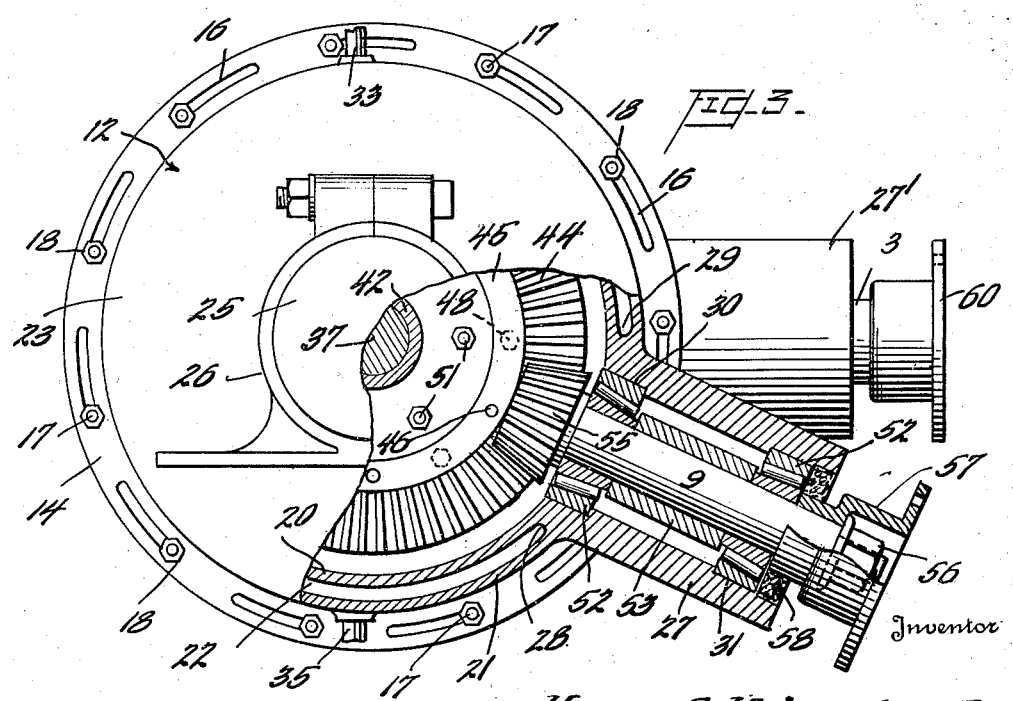
Inventor
Henry C. Heinsohn, Jr.,
By Parker Cook
Attorney July 27, 1948. H. C. HEINSOHN, JR 2,445,828
VARIABLE ANGLE GEAR CASING
Filed Oct. 30, 1945 3 Sheets-Sheet 2
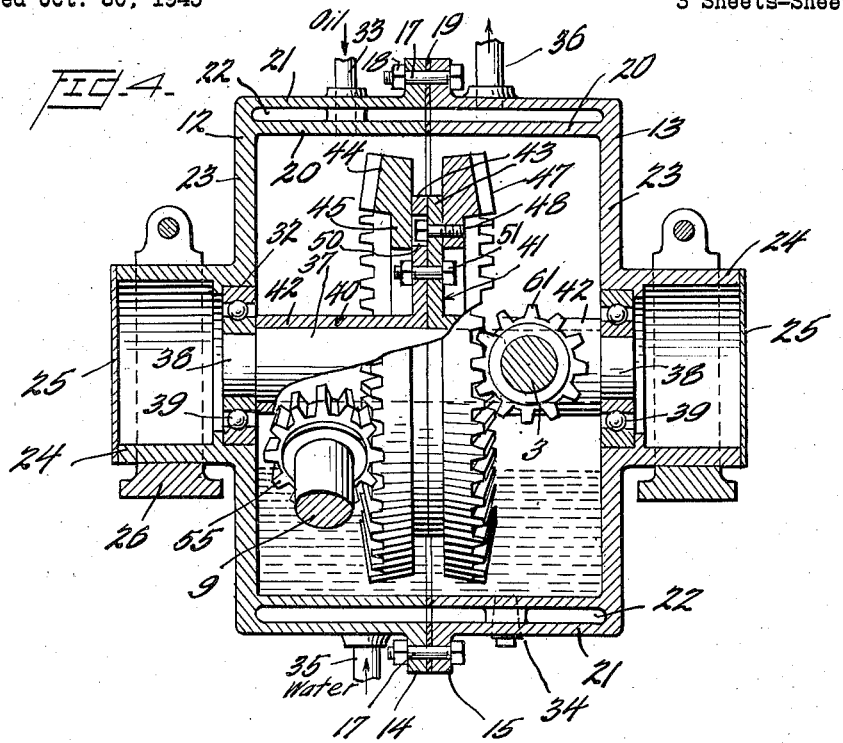
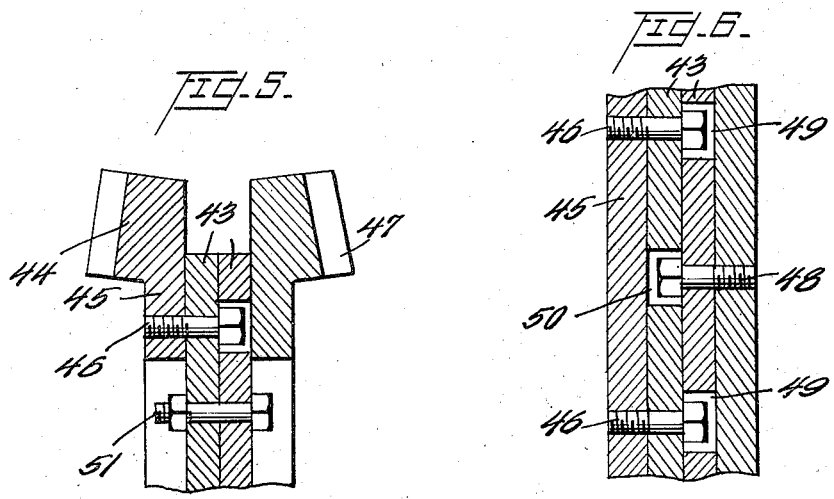
Inventor
Henry C. Heinsohn, Jr.,
By Parker Cook
Attorney July 27, 1948.  H. C. HEINSOHN, JR  2,445,828
VARIABLE ANGLE GEAR CASING
Filed Oct. 30, 1945   3 Sheets-Sheet 3
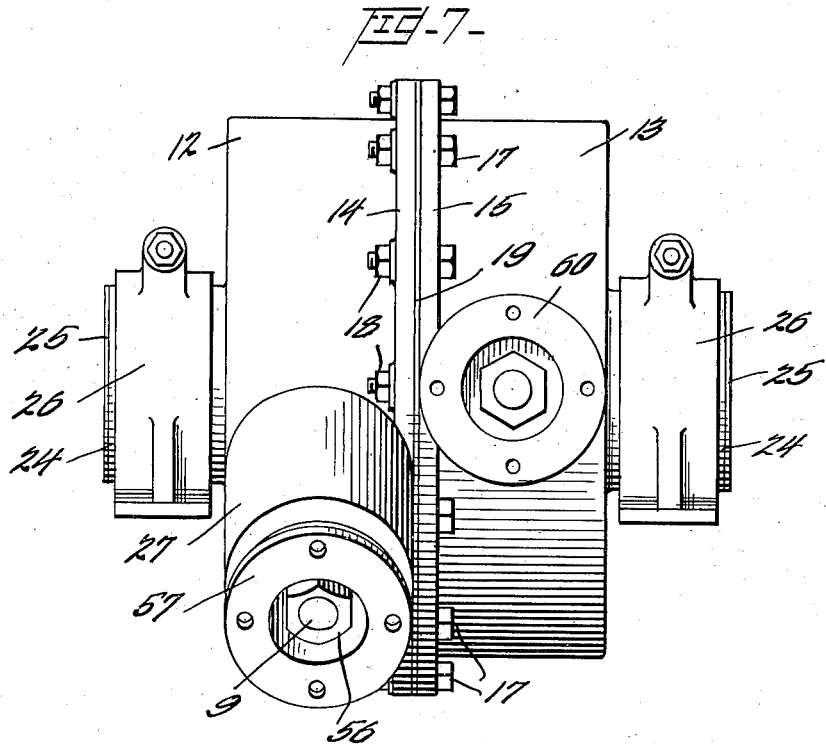
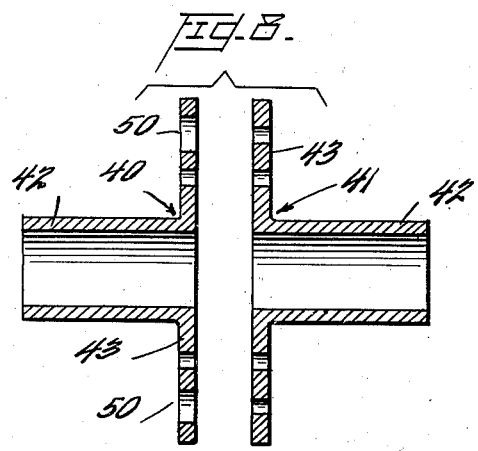

Patented July 27, 1948

2,445,828

UNITED STATES PATENT OFFICE 2,445,828

VARIABLE ANGLE GEAR CASING

Henry C. Heinsohn, Jr., Northfield, N. J., assignor to Ventnor Boat Works, Inc., West Atlantic City, N. J., a corporation of New Jersey Application October 30, 1945, Serial No. 625,630

3 Claims. (Cl. 74—385)

My invention relates to new and useful improvements in power transmission units and more particularly to a unit that is especially adapted for use in boats to provide what is known as a V drive.

Still another object of the invention is to provide a unit in the form of a gear transmission wherein the same may be used as a V drive and the angularity of the driven shaft adjusted or predetermined and then locked to accommodate the unit to the particular requirements arising with each installation.

Still another object of the invention is to provide a universally adjustable power gear transmission unit so that when the same is used as a V drive for a power boat, the angularity of the driven shaft with respect to the power shaft may be quickly adjusted to any angle, thus making it possible to install the unit in many instances where a non-adjustable unit could not be used.

Another object of the invention is to provide a power gear transmission wherein the angularity of the driven shaft may be quickly and easily changed through a relatively small number of degrees by simply loosening a few bolts in the gear casing and slightly revolving one-half of the gear casing with respect to the other half. However, should it be desired to greatly change the angularity of one shaft with respect to the other, the various bolts need simply be withdrawn and the two halves of the gear casing revolved the desired number of degrees and the bolts returned and then locked in position.

Still another object of the invention is to provide a power gear transmission unit capable of universal adjustment so that should the unit be used in connection with an engine, say to drive a winch, the driven shaft may be set at any desired angle through the three hundred and sixty degrees (360°).

Still another object of the invention is to provide a power gear transmission unit capable of universal adjustment comprising a divided gear case, the two halves being adjustable with respect to each other; also wherein the pinions and gears may be quickly and readily mounted in place so that if at any time it is desired to change the ratio between the drive and the driven shaft, suitable gear and pinions with more or less teeth may be substituted.

Still another object of the invention is to provide a power gear transmission wherein the casing may be water-cooled to thus prevent any overheating.

With these and numerous other objects in view the invention consists in certain, new and novel arrangements and combination of parts as will be hereinafter more fully described and pointed out in the claims.

Referring now to the drawings showing a preferred embodiment:

Fig. 1 is a diagrammatic view of the power transmission unit as installed for a V drive in a speed boat;

Fig. 2 is a view similar to Fig. 1 but showing the unit mounted in a commercial fishing boat and driving a winch, the driven shaft being shown at right angles to the drive shaft;

Fig. 3 is a side elevational view of the power gear transmission unit, part being shown in section and part being broken away for the sake of clearness of illustration;

Fig. 4 is a vertical sectional view, part being broken away for the sake of clearness of illustration;

Fig. 5 is a fragmentary sectional view showing the ring gears secured to their carriers;

Fig. 6 is a fragmentary detailed section showing the manner of staggering the bolts to hold the ring gears and carriers together.

Fig. 7 is a front view of the gear casing, and

Fig. 8 is a detailed view of the ring carriers.

Referring now to Fig. 1, there is shown in dot and dash lines, a speed boat or runabout 1, with the engine 2 mounted in the stern, from which extends the drive shaft 3 to the transmission unit 4 from which in turn extends the propeller shaft 5.

Due to the fact, that the angularity of the driven shaft (shortly to be mentioned) may be adjusted to any desired angle and then locked, the driven shaft may be readily aligned and connected to the propeller shaft regardless of the angularity of the propeller shaft.

This is an advantage in that, not only does it allow for a quicker and better installation, but it also makes it possible to use the unit where heretofore a non-adjustable unit could not be used.

In some instances it is true, universal joints can be used with different types of non-adjustable V-drive units but if the angle is too great, the universal joints soon wear and have to be replaced.

Thus, by having a universal adjustable unit, that is, one where the driven shaft may extend at any desired angle to the drive shaft, installations can be made that were heretofore impossible.

Referring to Fig. 2 for the moment, there is shown a commercial fishing boat 6, in dot and dash lines, an engine 7 and a propeller shaft 8. In this instance, the transmission unit 4 is mounted on the forward end of the engine to the crank shaft (not shown) and the driven shaft 9, it will be noticed, extends at right angles to the drive shaft 3. The driven shaft 9 is connected through a clutch 10, to a winch, 11.

It will be understood that these Fig. 1 and Fig. 2 merely illustrate the wide range of installation of the unit 4, and that the driven shaft may extend at any angle throughout the three hundred sixty degrees (360°) of the unit.

Referring now more particularly to the construction of the unit 4, reference is made to Fig. 3, Fig. 4 and Fig. 7.

It will be seen that the gear casing is made up of two like halves 12 and 13, which are circular in outline and are of sufficient thickness and diameter to provide an internal chamber for the gears and pinions shortly to be mentioned.

These half gear casings 12 and 13 are preferably cast and their inner adjacent faces are provided with an outstanding rim 14 and 15 respectively, and these rims as may be seen in Fig. 3 are provided with the circumferentially extending slots 16 through which extend the bolts 17 to be locked in position by the nuts 18.

In Fig. 4 there may be seen, the gasket 19 so that when the halves of the gear casings are fitted and locked in position by the bolts, the water from the water jacket cannot leak from between the halves, nor the oil from the gear chamber.

Inasmuch as these half gear casings are alike, a description of the one will be a description of both. It will be noticed that there is an inner circumferential wall 20, and the spaced outer circumferential wall 21, to provide the water jacket chamber 22.

This is a relatively narrow chamber and is open on the inner face of the casing so that it may register with the like chamber in the other half of the casing.

There is of course, the end wall 23, of the casing which is provided centrally with a hollow hub 24, over the end of which may be seen the end plate 25. These hollow hubs will be supported in the brackets 26 when the unit 4 is installed.

Extending radially from the half casing 12, is the circular throat 27 and it will be noticed in Fig. 3 that the water chamber 22, terminates on the opposite sides of this throat as at 28 and 29.

The throat is grooved at its inner ends as at 30, for the reception of a bearing, and likewise the throat is internally grooved at its outer end as at 31 for the reception of a second bearing.

It also may be noticed in Fig. 4, the hollow hub 24 has a central internal groove 32 at its inner end to receive a shaft bearing as will be later mentioned.

As also shown in Fig. 4, one of the halves 12 of the gear casing will be plugged and drilled for an oil supply 33. The oil supply should be kept to about the oil level designated in Fig. 4 so that the gears will run silently. Likewise, one of the half casings 13 should be plugged and drilled for an oil drain as may be seen at 34.

Also, there is the water inlet 35 and the water outlet 36.

As heretofore mentioned the gear casings are alike with the exception of these fittings, and of course oppositely disposed.

As far as the specification has proceeded it will be seen that there are two like casing halves 12 and 13 that when bolted together form a circular casing 4 with outstanding hubs 24 to be supported in brackets 26. Also these casings each have a radially extending circular throat, and the two halves are so mounted that the angularity of the throats may be adjusted at the desired predetermined angle with relation to each other.

Having described the gear box or gear casing reference is now made to the gears and pinions and their assembly that make up the unit.

Still referring to Fig. 4 there may be seen, the central supporting shaft 37 with its oppositely reduced ends 38 mounted in the ball bearings 39 which in turn are mounted within the opposite internal grooves 32 of the aforementioned hubs 24. Mounted on the shaft 37 are the carriers 40, and 41 and these carriers are also alike but oppositely positioned. Each consists of a circular sleeve 42 and an upstanding flange 43, and these flanges are positioned face to face to provide a support for their ring gears about to be mentioned.

Referring for the moment to Fig. 4 and Fig. 5 there will be seen the ring gear 44 provided with an inner flange 45, this flange being drilled and threaded at different points through its periphery so that the bolts 46 may extend through the flange 43 of the carrier 40 into flange 45 of the ring gear, 44.

In the same way the ring gear 47 will be attached to its carrier 41 by bolts 48. These bolts 46 and 48 are in staggered relation with each other so that small pockets 49 and 50 may be formed in the adjacent faces of the carriers 40 and 41 so that the bolts do not in any way interfere with the locking of these two flanges of the carrier.

After the carriers 40 and 41 with their ring gears are assembled the flanges 43 of the carriers 40 and 41 are bolted together by the bolts 51 to form a functionally integral oppositely faced gear.

Referring to Fig. 3 for the moment, there may be seen mounted in the throat 27 the inner and outer roller bearings 52 and the spacer 53, while mounted within these bearings is the driven shaft 9 with the pinion 55 mounted on its end to mesh with the ring gear, 44.

The outer end of the shaft 9 is threaded and provided with the nut 56 to hold a shaft coupling 57 in place. There may also be seen at the outer end of the throat, the pinion bearing oil seal 58.

As heretofore mentioned, drive shaft 3 will have secured thereto a coupling 60; also the bearing arrangement in the similar throat 27' of the half casing 13 is similar to the one just described.

There will also be of course, a pinion 61 on the inner end of the drive shaft 3 that will mesh with its ring gear 47.

Thus on the rotation of the drive shaft 3 with its pinion 61 power will be transmitted through the ring gear 47 to the carriers and ring gear 44 to thus in turn operate the driven shaft 9, through the pinion 55.

If it is desired to have the ratio between the drive and the driven shaft, say one to one, then the number of teeth in the one ring gear will be the same as in the other ring gear. However, should a different ratio be desired, a ring gear with a different number of teeth and/or pitch together with a mating pinion may be readily installed by removing its gears and carriers from the casing, removing the bolts and then substituting the new desired ring gear and pinion.

It will be understood that although bevel gear and pinions are shown, other types may be used such as hypoid gears or spiral bevel gears as used in the differential of an automobile. In fact, I have found that when the hypoid gears or the spiral bevel are used the unit is practically noiseless.

As may be seen in Fig. 3 the angularity of the driven shaft 9 with relation to the drive shaft 3 may be varied a few degrees by simply loosening the bolts 17 in the slot 16 and revolving the half casing 12 through the distance of the slots 16. On the other hand, should it be desired to change the angularity greater than allowed for by the length of the arcuate slots, the bolts 17 will simply be removed and the casings rotated with respect to each the desired amount after which the bolts will be placed in the now adjacent slots, where any small variation may again be allowed for, and the bolts then tightened.

As heretofore mentioned, the unit may be advantageously used in power boats as it permits the engine to be mounted in the stern with the front of the engine to be positioned towards the bow, thus allowing more room amidships.

Furthermore, as found in a number of instances by mounting the engine in the stern several knots can be added to the speed due the weight being placed in the stern rather than the amidships. Again it permits of a silent operation regardless of the angle to the propeller shaft.

Finally, the unit may be used as a power take off that is, the driven shaft may extend at any angle through to three hundred sixty degrees (360°) so that the driven shaft may be connected to winches or wherever power is desired.

Finally it will be understood that although the unit is illustrated as used with a marine engine, it may be used wherever power shafting is needed and the driven shaft to extend at any angle desired, to the drive shaft.

Having thus described my invention what I claim is new and desire to secure by Letters Patent is:

1. In a transmission unit, two like but oppositely disposed half casings, integral throats extending radially from each of the half casings, means for locking the half casings so that the throats extend at any desired angle to each other, a drive shaft mounted in one throat provided with a pinion on its end, a driven shaft mounted in the other throat, and also provided with a pinion at its inner end, functionally integral gears meshing with the respective pinions; means mounted in the unit for supporting the functionally integral gears, means extending from the unit for supporting the half casings in the desired rotative position, spaced circumferential walls in the oppositely disposed half casings, concentric to the functionally integral gears and registering to form a water chamber unaffected by the rotative position of said casings.

2. A power transmission unit including two like but oppositely disposed half casings, each casing having adjacent circumferential flanges provided with slots and means for locking the said half casings in a predetermined rotative position with respect to each other; each of said casings having a radially disposed throat, circumferentially arranged registering water jackets formed internally of the respective half casings and terminating at the respective throats; a centrally supported bearing shaft mounted in the casings, carriers mounted on said shaft, oppositely disposed ring gears secured to the respective carriers and said carriers secured to each other to form an integrally functional structure, a drive shaft mounted in the one throat having a pinion mounted on its end meshing with one of said ring gears, a driven shaft mounted in the other of said throats and having a pinion on its end meshing with the other of said ring gears; the rotative adjustability of the half casings and their radially extending throats permitting the driven shaft to extend at any desired angle, to the drive shaft and in no way affect the function of the water jacket.

3. In a transmission unit, two like but oppositely disposed half casings, integral throats extending radially from each of the half casings, means for locking the half casings so that the throats can extend at any desired angle to each other, each of said casings having inner circumferential spaced walls to form a water jacket and their ends terminating at the respective throats, and said circumferential walls registering when the half casings are locked to form one circumferential water jacket.

HENRY C. HEINSOHN, JR.

REFERENCES CITED

The following references are of record in the file of this patent:

UNITED STATES PATENTS

| Number | Name | Date |
|---|---|---|
| 1,327,080 | Deibel | Jan. 6, 1920 |
| 1,788,978 | Buckendale | Jan. 13, 1931 |
| 1,970,652 | Hammitt | Aug. 21, 1934 |
| 2,113,868 | Acker | Apr. 12, 1938 |
| 2,184,380 | Deibel | Dec. 26, 1939 |

FOREIGN PATENTS

| Number | Country | Date |
|---|---|---|
| 368,664 | France | Dec. 8, 1906 |